United States Patent
Tajima et al.

(10) Patent No.: US 8,606,278 B2
(45) Date of Patent: Dec. 10, 2013

(54) MOBILE COMMUNICATION SYSTEM, CELL SELECTION METHOD, BASE STATION APPARATUS, AND MOBILE STATION APPARATUS

(75) Inventors: Yoshiharu Tajima, Kawasaki (JP); Yoshinori Tanaka, Kawasaki (JP); Yoshihiro Kawasaki, Kawasaki (JP); Yoshiaki Ohta, Kawasaki (JP); Katsumasa Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/607,139

(22) Filed: Sep. 7, 2012

(65) Prior Publication Data

US 2012/0329463 A1  Dec. 27, 2012

Related U.S. Application Data

(63) Continuation of application No. PCT/JP2010/054128, filed on Mar. 11, 2010.

(51) Int. Cl.
*H04W 36/00* (2009.01)

(52) U.S. Cl.
USPC ............................ 455/437; 455/440; 455/441

(58) Field of Classification Search
USPC .................... 455/436, 437, 440, 441
See application file for complete search history.

(56) References Cited

U.S. PATENT DOCUMENTS

| 5,465,389 | A | * | 11/1995 | Agrawal et al. | 455/437 |
| 6,785,514 | B1 | | 8/2004 | Raaf | |
| 2010/0130212 | A1 | * | 5/2010 | So et al. | 455/444 |

FOREIGN PATENT DOCUMENTS

| JP | 2002-027519 | 1/2002 |
| JP | 2002-521857 | 7/2002 |
| JP | 2005-072709 | 3/2005 |
| JP | 2006-050366 | 2/2006 |
| JP | 2008-016991 | 1/2008 |
| JP | 2008-236727 | 10/2008 |
| WO | 00/04661 | 1/2000 |

OTHER PUBLICATIONS

International search report issued for corresponding International Patent Application No. PCT/JP2010/054128, mailed Apr. 20, 2010 with English translation.
3GPP TR 25.913 V7.3.0; 3rd Generation Partnership Project; Technical Specification Group Radio Access Network; "Requirements for Evolved UTRA (E-UTRA) and Evolved UTRAN (E-UTRAN) (Release 7)"; Mar. 2006.
3GPP TR 36.913 V8.0.1; 3rd Generation Partnership Project; Technical Specification Group Radio Access Network; "Requirements for further advancements for Evolved Universal Terrestrial Radio Access (E-UTRA) (LTE-Advanced) (Release 8)"; Mar. 2009.

(Continued)

*Primary Examiner* — Temica M Beamer
(74) *Attorney, Agent, or Firm* — Myers Wolin, LLC

(57) ABSTRACT

A mobile communication system includes plural base stations forming cells and a mobile station disposed in one of the cells and wirelessly communicating with one of the plural base stations. One of the plural base stations includes a cell group information broadcast unit broadcasting plural cell group information items which are information indicating a relationship between moving directions and cell groups, and the mobile station includes a cell group information selection unit selecting a cell group information item corresponding to an estimated moving direction of the mobile station out of the plural cell group information items broadcast by the one of the plural base stations, and a standby cell selection unit selecting, as a new standby cell, a cell having a receiving state satisfying a desired condition from among cells included in the selected cell group information item.

12 Claims, 12 Drawing Sheets

(56) References Cited

OTHER PUBLICATIONS

3GPP TS 36.304 V8.5.0; 3rd Generation Partnership Project; Technical Specification Group Radio Access Network; Evolved Universal Terrestrial Radio Access (E-UTRA); "User Equipment (UE) procedures in idle mode (Release 8)"; Mar. 2009.

3GPP TS 36.331 V8.8.0; 3rd Generation Partnership Project; Technical Specification Group Radio Access Network; Evolved Universal Terrestrial Radio Access (E-UTRA) Radio Resource Control (RRC); "Protocol specification (Release 8)"; Dec. 2009.

* cited by examiner

FIG.5

| MOVING DIRECTION | CELL GROUP |
|---|---|
| 0° | #5(F1), #0(F1), #1(F2) |
| 60° | #0(F1), #1(F2), #2(F2) |
| 120° | #1(F2), #2(F2), #3(F2) |
| 180° | #2(F2), #3(F2), #4(F1) |
| 240° | #3(F2), #4(F1), #5(F1) |
| 300° | #4(F1), #5(F1), #0(F1) |

FIG.10

| MOVING DIRECTION | FIRST PRIORITY LEVEL | SECOND PRIORITY LEVEL | ... |
|---|---|---|---|
| 0° | F1 | F2 | |
| 60° | F2 | F1 | |
| 120° | F2 | F1 | |
| 180° | F2 | F1 | |
| 240° | F1 | F2 | |
| 300° | F1 | F2 | |

MOBILE COMMUNICATION SYSTEM, CELL SELECTION METHOD, BASE STATION APPARATUS, AND MOBILE STATION APPARATUS

CROSS-REFERENCE TO RELATED APPLICATION

This application is a continuation application of International Application PCT/JP2010/054128 filed on Mar. 11, 2010 and designated the U.S., the entire contents of which are incorporated herein by reference.

FIELD

The embodiment discussed herein is related to a mobile communication system, a cell selection method, a base station apparatus, and a mobile station apparatus.

BACKGROUND

In a mobile communication system including cellular phones, a cellular method is generally used in which a base station covers a large area formed by combining plural areas where the base station may transmit and receive (i.e., cells), and a mobile station changes (switches) from a base station to another base station with the movement of the mobile station.

Currently, services have been available that are based on the third generation mobile communication system using the Direct Sequence Code Division Multiple Access (CDMA) scheme. On the other hand, research and development has also been actively carried out for a next-generation mobile communication system that may provide faster communications. In this regard, in the 3rd Generation Partnership Project (3GPP), a Long Term Evolution (LTE) has been studied to start providing services (see, for example, 3GPP TR25.913 V7.3.0) Further, an LTE-advanced which is a developed version of the LTE has also been studied (see, for example, 3GPP TS36.913 V8.0.1, 3GPP TS36.304, V8.5.0, Sec. 5.2.4, and 3GPP TS36.331 V8.8.0, Sec.6.3.1).

SUMMARY

According to an aspect of the present invention, a mobile communication system includes plural base stations forming cells and a mobile station being disposed in one of the cells and wirelessly communicating with one of the plural base stations.

One of the plural base stations includes a cell group information broadcast unit broadcasting plural cell group information items which are information indicating a relationship between moving directions and cell groups.

The mobile station includes a cell group information selection unit, when receiving quality is reduced in a standby operation, selecting a cell group information item corresponding to an estimated moving direction of the mobile station out of the plural cell group information items broadcast by the one of the plural base station, and a standby cell selection unit selecting, as a new standby cell, a cell having a receiving state satisfying a desired condition from among cells included in the selected cell group information item.

The object and advantages of the invention will be realized and attained b means of the elements and combinations particularly pointed out in the claims.

It is to be understood that both the foregoing generation description and the following detailed description are exemplary and explanatory and at not restrictive of the invention.

BRIEF DESCRIPTION OF DRAWINGS

FIG. 5 is an example of a cell group table according to the first embodiment;

FIG. 10 is an example of a priority level set table according to the second embodiment;

DESCRIPTION OF EMBODIMENT

In a generation mobile communication system, a mobile station performs a cell selection and a cell reselection based on a received level or a communication quality while waiting (in a standby state). In the LTE, when a cell is included in (regarded as) a re-selection target (a cell to be re-selected), the cell using a frequency band (Inter-frequency) which is different from another frequency band (Intra-frequency) used in the standby state, a different selection criterion may be used.

Specifically, priority levels may be set (assigned) to the respective frequency bands. Then, a mobile station first performs a cell search within a frequency band having a higher priority level. Then, the mobile station selects a cell having the received level satisfying a predetermined value and the highest receiving level, the cell being formed by a base station, as a new standby cell.

In this case, when no cell satisfying the predetermined value is found, the cell search is performed within a frequency band having the next highest priority level. When no cell satisfying the predetermined value is found in all the frequency bands, it is determined that the mobiles station is in an out-of-service area.

In such a cell selection method, in a case where there is a cell providing a higher received level but practically has a lower priority level, if there is a cell having the received level satisfying the predetermined value within a frequency band having a higher priority level, the cell may be selected. As a result, the mobile station may not always select an appropriate cell.

In the LTE, a cell reselection process may be as follows:

(1): When the received level is reduced in the standby state, the mobile station starts a cell reselection process.

(2): When plural frequency bands (e.g., F1 and F2) are broadcast (reported), a cell search is (first) preformed on a frequency band having a higher priority level (e.g., F1).

(3): When determining that three is a base station having the maximum received level detected in F1 as a result of the cell search satisfies a predetermined received level, the base station is determined as a new standby base station, and the cell reselection process ends.

(4): When determining that no base station satisfying the predetermined received level, the cell search is performed on the frequency band having the next highest priority level (F2).

(5): When determining that there is a base station having the maximum received level detected in F2 as a result of the cell search satisfies the predetermined received level, the base station is determined as a new standby base station, and the cell reselection process ends.

(6): Even after the cell search is sequentially performed on all frequency bands when determining that there is no base station satisfying the predetermined received level, it is determined that the mobile station is in an out-of-service area.

Figure 1:
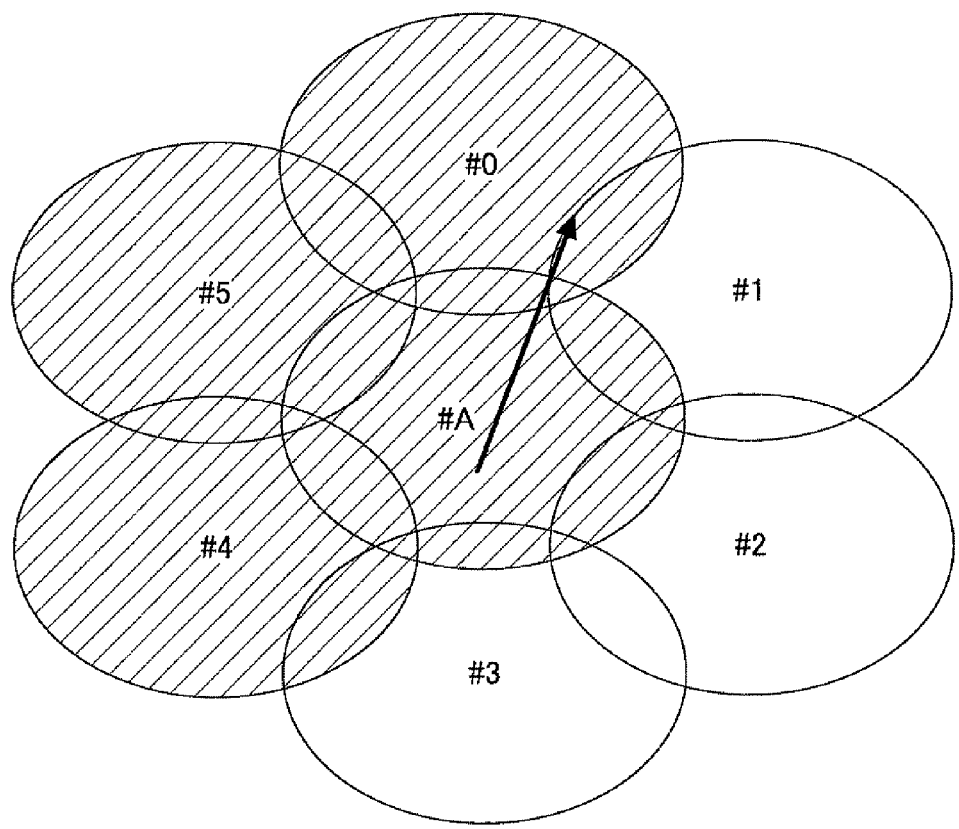
FIG. 1 is a drawing illustrating an example of a cell reselection method of related art.
Figure 2:
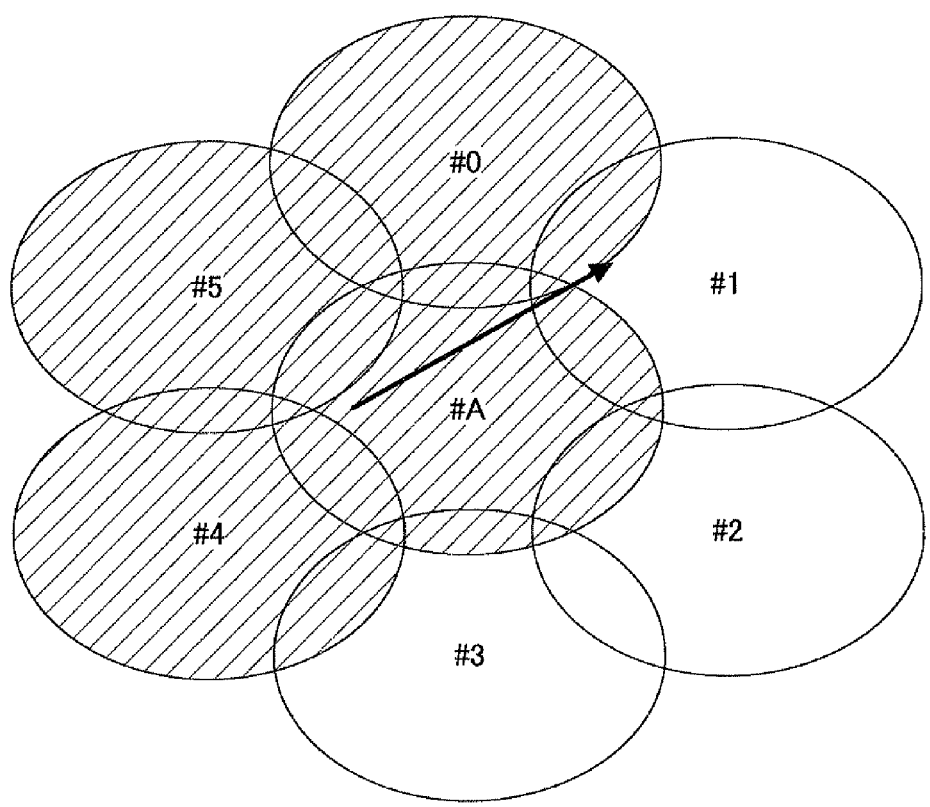
FIG. 2 is another drawing illustrating an example of the cell reselection method of related art.

FIGS. 1 and 2 illustrate cases of a cell reselection method in related art. In these cases, a mobile station is located within a cell #A. The cells #0 through #5 are neighboring cells of the cell #A. Here, it is assumed that the cells #A, #4, #5, and #0 hatched in the figures use a frequency band F1, and the cells #1, #2, and #3 without being hatched use a frequency band F2.

In FIG. 1, it is assumed that the priority level of the frequency band F2 is higher than that of the frequency band F1. In this case, when the mobile station moves in the arrow direction from the cell #A and exits from the cell #A, the received level of the cell #A is reduced. Accordingly, the mobile station performs a cell search process to select a new standby cell.

To that end, the mobile station first searches the cells #1, #2, and #3 of the frequency band F2 having a higher priority level. Among the cells, the cell #1 is located nearest to the moving direction (path) of the mobile station. As a result, the received level of the cell #1 becomes the highest.

In this case, the received level of the cell #1 satisfies a predetermined level, the cell #1 is selected as the new standby cell. However, in this case, the cell that may have the highest received level for the mobile station is the cell #0. Therefore, it is the cell #0 that is to be selected as the new standby cell.

On the other hand, it is assumed that the priority level of the frequency band F1 is higher than that of the frequency band F2. In this case, when the mobile station moves in the arrow direction from the cell #A and exits from the cell #A, the received level of the cell #A is reduced.

Accordingly, the mobile station performs the cell search process to select a new standby cell. To that end, the mobile station first searches the cells #4, #5, and #0 of the frequency band F1 having a higher priority level. Among the cells, the cell #0 is located nearest to the moving direction (path) of the mobile station.

As a result, the received level of the cell #0 becomes the highest. In this case, the received level of the cell #0 satisfies the predetermined level, the cell #0 is selected as the new standby cell. However, in this case, the cell that may have the highest received level for the mobile station is the cell #1. Therefore, it is the cell #1 that is to be selected as the new standby cell.

As describe above, when the base station uses fixed priority levels, a cell which is not appropriate may be selected by the mobile station. Particularly, in the LTE-advanced, the introduction of the spectrum aggregation is being considered.

If the spectrum aggregation is introduced, the mobile station may have to perform the cell selection process based on plural frequency bands whenever the mobile station moves from one cell to another. As a result, an inappropriate cell may be more likely to be selected.

According to an aspect of the present invention, it is possible to select an appropriate cell as a standby cell.

In the following, embodiments are described with reference to the accompanying drawings.

First Embodiment

In this first embodiment, a mobile station estimates the moving direction of the mobile station based on a move history of the mobile station or the like. Further, the mobile station selects a cell group to be searched based on information indicating a relationship between the moving direction reported from the base station and cell groups.

Then, the mobile station selects a cell as a new standby cell from among the cells included in the selected cell group based on a received state such as a receiving level or a receiving quality.

Figure 3:
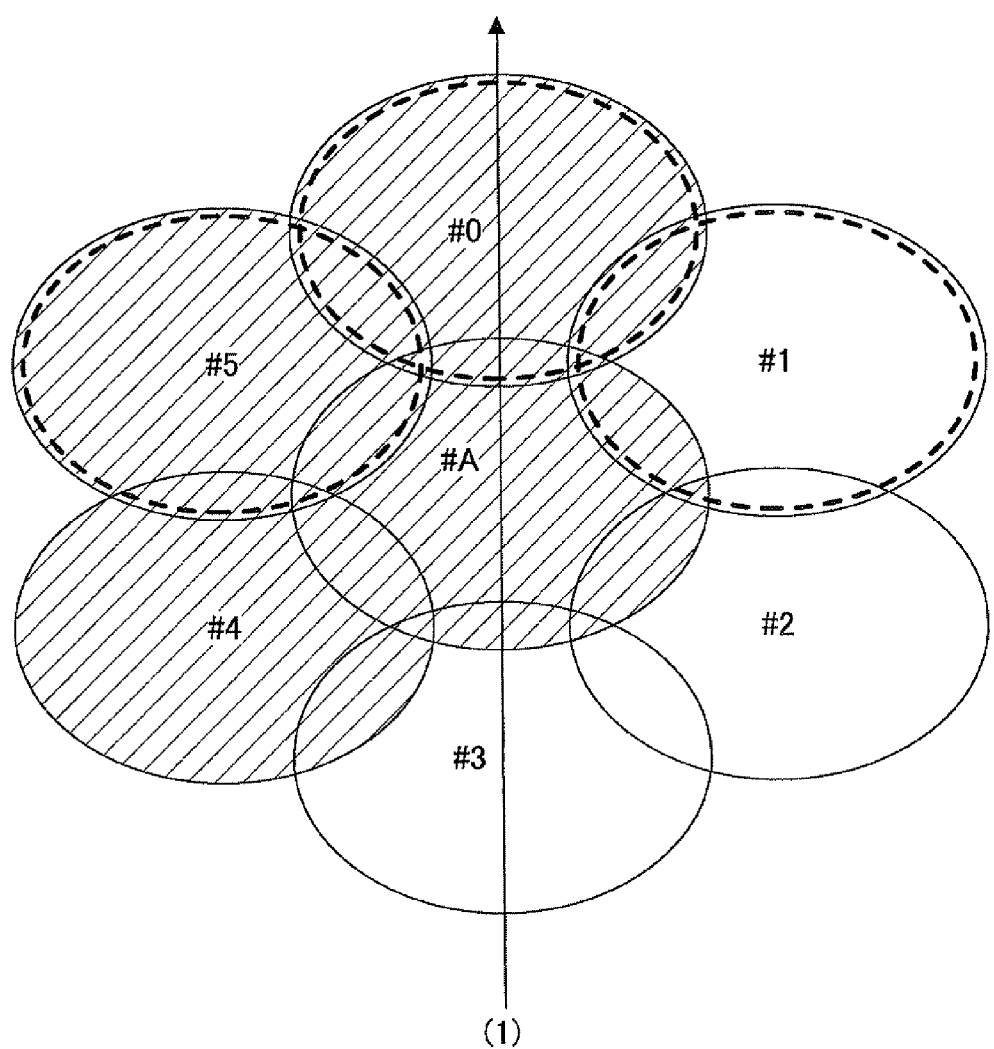
FIG. 3 is a drawing illustrating an example of a cell selection method according to a first embodiment.

FIG. 3 illustrates an example cell selection method according to a first embodiment. In FIG. 3, the cells are described as ellipses, the cell numbers are described as alphanumeric characters in the ellipses. Here, the mobile station is located in the cell #A, and the cells #0 through #5 are neighboring cells of the cell #A. Here, it is assumed that the cells #A, #4, #5, and #0 are hatched in the figure and use a frequency band F1, and the cells #1, #2, and #3 without hatching use a frequency band F2.

As a broadcast information, the cells periodically report a cell group information for each of the moving directions of the mobile station. The cell group information includes plural cell groups with respect to the moving directions, each of the cell groups including neighboring cells of the cell where the mobile station is located. More specifically, each of the cell groups includes cell numbers of plural cells and the frequency band information corresponding to the plural cells.

When the mobile station located in the cell #A detects the reduction of the received level (or the received quality), the mobile station performs the cell reselection process to determine a new standby cell. In this case, the mobile station first estimates the moving direction of the mobile station. To that end, a Global Positioning System (GPS) or the like may be used to determine the moving direction. However, the moving direction may also be estimated based on the move history of the mobile station.

For example, when assuming that the mobile station was located in the cell #3 before being located in the cell #A, the moving direction may be estimated to be the direction parallel in the arrow (1) direction. Once the moving direction is estimated, the mobile station selects a cell group where the mobile station moving in the arrow (1) direction may have to search. In this case, the cell group to be selected includes the cells #5, #0, and #1 which are surrounded by the dotted lines, respectively.

The mobile station measures the received levels (or the received qualities) of the respective cells #5, #0, and #1, and selects an appropriate cell (the cell #0 in this case) as the new standby cell.

Base Station Apparatus

Figure 4:
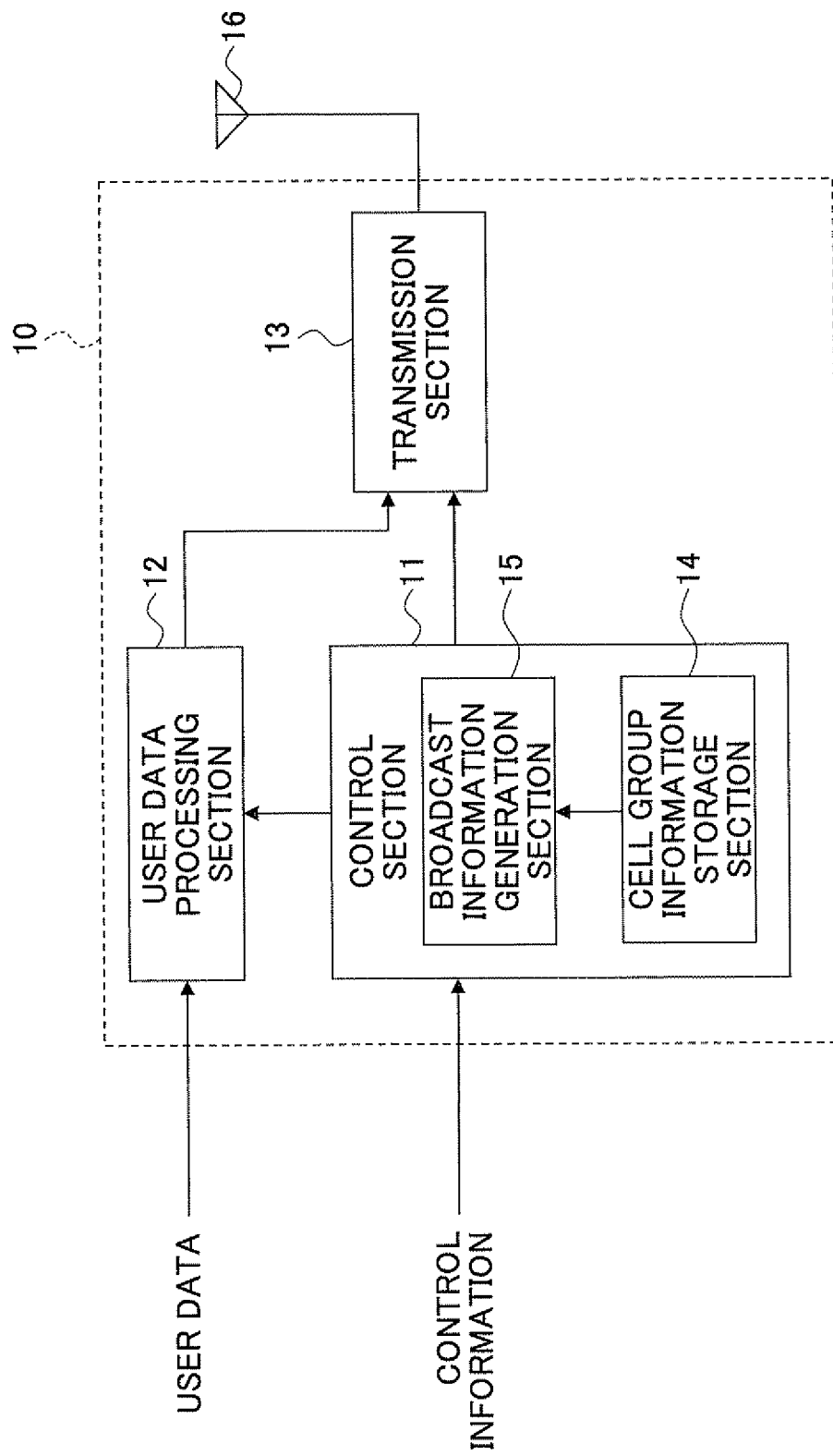
FIG. 4 is a drawing illustrating an example configuration of a base station apparatus according to the first embodiment.

FIG. 4 illustrates an example configuration of the base station apparatus forming cells. Here, a part is illustrated where a process relevant to downlink user data and control data is performed. In FIG. 4, a base station apparatus 10 includes a control section 11, a user data processing section 12, and a transmission section 13.

It is assumed that the base station apparatus 10 already knows the arranged state of the base stations of the neighboring cells and the frequency bands used in the cells. Based on that, in a cell group information storage section 14 of the control section 11, a cell group table information where the cell groups are associated with the moving directions is registered in advance.

FIG. 5 illustrates an example of a cell group table according to an embodiment. The cell group table of FIG. 5 exemplarily illustrates the contents of the cell group information storage section 14 of the base station apparatus 10 forming the cell #A of FIG. 3. Here, the degrees of the moving directions are determined by assuming that the north direction (cell#0 direction) from the base station apparatus of the cell #A is 0 degrees, and increases in the clockwise direction.

In the cell groups, the cell numbers of plural cells and the frequency bands (in parentheses after cell number) of the cells are registered. Here, a case is described where the number of the moving directions in the cell group table is six. However, the number of the moving directions in the cell group table may be more than or less than six.

A broadcast information generation section 15 in the control section 11 receives control information from an upper apparatus (e.g., a base station control apparatus), and also receives the cell group table information from the cell group information storage section 14. The broadcast information generation section 15 generates a broadcast information based on the control information and the cell group table information.

Further, the broadcast information generation section 15 generates an error correction code with respect to the broadcast information, performs data modulation based on a designated modulation method to output a downlink control signal to the transmission section 13.

The user data processing section 12 receives downlink user data from the upper apparatus (e.g., the base station control apparatus). The user data processing section 12 generates an error correction code with respect to the user data and performs data modulation based on the designated modulation method to output a downlink data signal to the transmission section 13.

The transmission section 13 multiplexes the downlink control signal from the control section 11 with the downlink data signal from the user data processing section 12 to generate a signal based on a predetermined radio access method (Orthogonal Frequency Division Multiplexing Access (OFDMA)). After that, the signal is converted from a base baseband signal to a radio-frequency signal by performing a D/A conversion, so that the radio frequency signal is transmitted via an antenna 16.

The System Information Book type 3 (SIB3) to SIB8 of 3GPP TS36.331 V8.8.0, Sec.6.3.1 describes the broadcast information with respect to the neighboring cells. Among these, SIB5 describes the configurations of the Intra-frequency cell reselection information for each frequency. The configuration may be changed to the configurations for each moving directions. By doing this, the cell group table information may be broadcast (reported).

Mobile Station Apparatus

Figure 6:
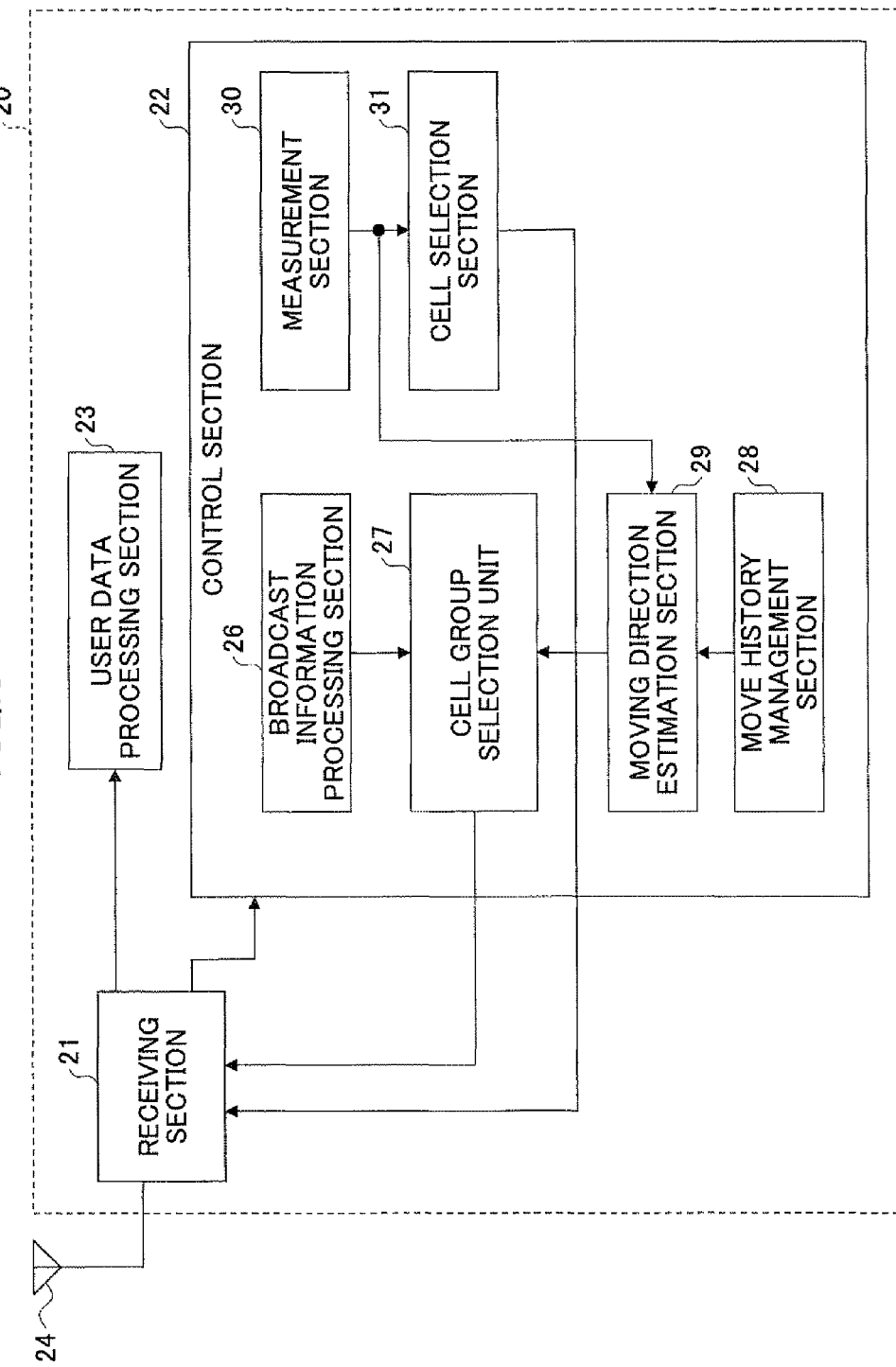
FIG. 6 is a drawing illustrating an example configuration of a moving station apparatus according to the first embodiment.

FIG. 6 illustrates an example configuration of a mobile station apparatus according to the first embodiment.

Here, a part is illustrated where a process relevant to downlink user data and control data is performed. In FIG. 6, a mobile station apparatus 20 includes a receiving section 21, a control section 22, and a user data processing section 23.

The receiving section 21 converts the radio frequency signal received by an antenna 24 into a baseband signal, and performs A/D conversion. Further, the receiving section 21 performs a receiving process based on the predetermined radio access method (OFDMA), the receiving process including Fast Fourier Transform (FFT) timing detection, removal of Guard Interval (GI), a FFT process and the like, so that the received signal is separated into the data signal and the control signal. The separated control signal is output to the control section 22, and the separated data signal is output to the user data processing section 23.

A broadcast information processing section 26 in the control section 22 extracts the cell group table information illustrated in FIG. 5 from the control signal received from the receiving section 21, and outputs the cell group table information to a cell group selection section 27. The cell group selection section 27 stores the cell group table information.

A move history management section 28 stores the information of the cells where the mobile station had been located before. Upon receiving a report from a measurement section 30, the report indicating that the received level (or the received quality) at the receiving section 21 is reduced to a level lower than a predetermined threshold value, a moving direction estimation section 29 receives the information of the cells where the mobile station had been previously located from the move history management section 28, and estimates the moving direction of the mobile station based on the information.

Then, the moving direction estimation section 29 reports the estimated moving direction to the cell group selection section 27. Alternatively, the move history management section 28 may store past GPS information, so that the moving direction estimation section 29 may estimate the moving direction based on the GPS information.

The cell group selection section 27 selects the cell group corresponding to the moving direction of the mobile station based on the cell group table information of FIG. 5, and sequentially reads and outputs the cell numbers of the plural cells and the frequency bands included in the selected cell group to the receiving section 21. Upon receiving the cell numbers of the plural cells and the frequency bands included in the selected cell group, the receiving section 21 searches the frequency bands corresponding to the plural cells.

The measurement section 30 in the control section 22 measures the received level (or the received quality) at the receiving section 21, and reports the measured value to a cell selection section 31. Further, the measurement section 30 reports information indicating whether the (measured) received level (or the received quality) is greater than or less than a predetermined value or less than the predetermined value to the cell selection section 31 and the moving direction estimation section 29.

While the receiving section 21 searches the plural cells included in the cell, the cell selection section 31 selects the cell having the received level (or the received quality) greater than or equal to the predetermined threshold value and having the maximum receiving level (or the receiving quality) as the standby cell (reselection cell). The cell selection section 31 stores and outputs the information of the selected cell to the receiving section 21.

Flowchart

Figure 7:
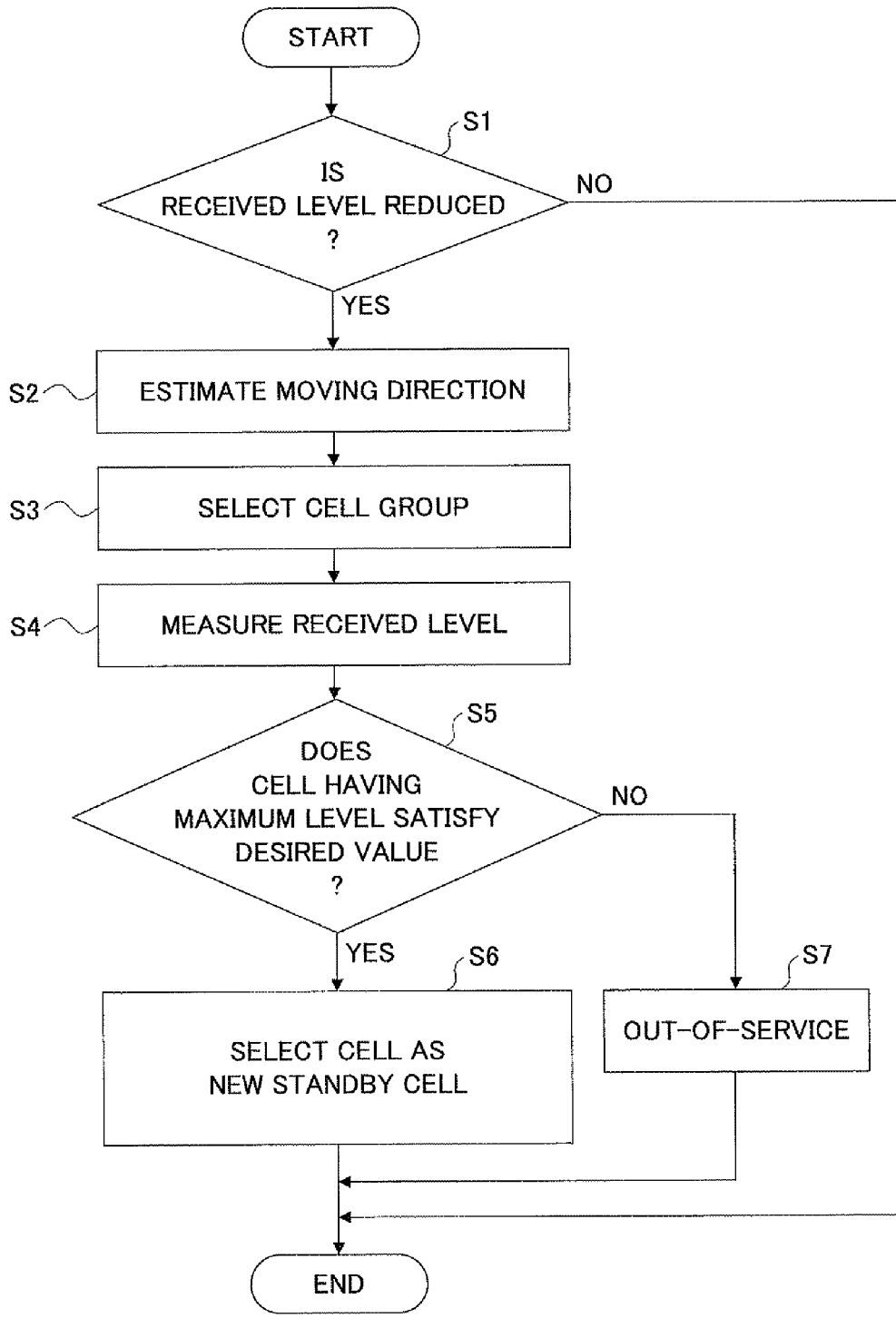
FIG. 7 is an example flowchart of a cell reselection process according to the first embodiment.

FIG. 7 is an example flowchart of the cell reselection process executed by the mobile station apparatus according to the first embodiment. In FIG. 7, in step S1, the measurement section 30 determines whether the receive level (or the received quality) is lower than a predetermined value. When determining that the receive level (or the received quality) is lower than the predetermined value (YES in step S1), the process goes to step S2. Otherwise (i.e., NO in step S1), the process ends.

In step S2, the moving direction estimation section 29 estimates the moving direction of the mobile station based on the information indicating the cells where the mobile stations had been previously located, the information being received from the move history management section 28. In step S3, the cell group selection section 27 selects the cell group corresponding to the moving direction of the mobile station based on the cell group table information.

In step S4, the measurement section 30 searches the plural cells included in the selected cell group, and measures the received level (or the received quality) of the cells included in the cell group.

Next, in step S5, the cell selection section 31 determines whether the maximum received level (or the received quality) of the cell satisfies a required value, that is, whether the received level (or the received quality) is greater than or equal to a threshold value. When determining that the condition in step S5 is satisfied (YES in step S5), the process goes to step S6.

In step S6, the cell (i.e., the cell having the maximum received quality) is selected as the new standby cell. On the other hand, when determining that the condition in step S5 is not satisfied (NO in step S5), the process goes to step S7. In step S7, it is determined that the mobile station is located in an out-of-service area. After step S6 or S7, the process ends.

By doing this, it may become possible to select an appropriate cell as the standby cell in accordance with the moving direction of the mobile station.

In this embodiment, the terms "broadcast information generation section 15", "cell group selection section 27", and "cell selection section 31" are used as the examples of a cell group information broadcast unit, a cell group information selection unit, and a standby cell selection unit, respectively.

Second Embodiment

In this second embodiment, a mobile station estimates the moving direction of the mobile station based on the move history of the mobile station or the like. Further, the mobile station selects a frequency band having a higher priority level based on information indicating the relationship between the moving directions and the priority levels, the information being broadcast (reported) from the base station. Then, the mobile station selects a new standby cell in accordance with the received level (or the received quality) based on the frequency band.

Figure 8:
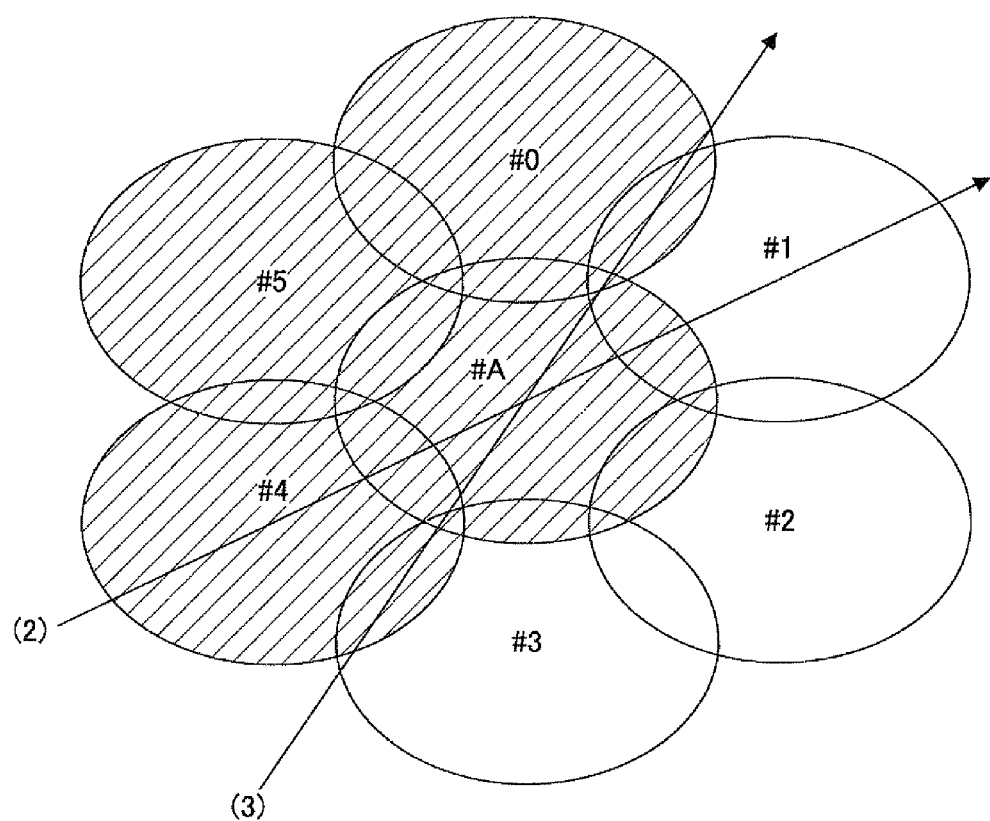
FIG. 8 is a drawing illustrating an example of a cell selection method according to a second embodiment.

FIG. 8 illustrates an example cell selection method according to a second embodiment. In FIG. 8, the cells are described as ellipses, the cell numbers are described as alphanumeric characters in the ellipses. Here, the mobile station is located in the cell #A, and the cells #0 through #5 are neighboring cells of the cell #A. Here, it is assumed that a frequency band F1 is used in the cells #A, #4, #5, and #0 hatched in the figure, and a frequency band F2 is used in the cells #1, #2, and #3 without hatching in the figure.

As broadcast information, the cells periodically report a priority level set information for each of the moving directions of the mobile station. The priority level set information herein refers to a priority level set corresponding to the moving direction. More specifically, the priority level set information includes, for example, the frequency band having the first priority level, the frequency band having the second priority level and the like for each of the moving directions.

When the mobile station located in the cell #A detects the reduction of the received level (or the received quality), the mobile station performs the cell reselection process to determine a new standby cell. In this case, the mobile station first estimates the moving direction of the mobile station. To that end, a GPS or the like may be used to determine the moving direction. However, the moving direction may also be estimated based on the move history of the mobile station.

For example, when assuming that the mobile station was previously located in the cell #4 before being located in the cell #A, the moving direction may be estimated to be the direction parallel to the arrow (2) direction. Once the moving direction is estimated, the mobile station selects the priority level set of the frequency bands based on the broadcast information broadcast from the base station of the cell #A. According to the priority level set where the moving direction corresponds to the arrow (2) direction, the priority level of the frequency band F2 is set higher (as the first priority level).

In this case, the mobile station measures the received levels (or the received qualities) of the frequency band F2 (i.e., the cells #1, #2, and #3), and selects an appropriate cell (the cell #1 in this case) as a new standby cell.

On the other hand, there may be a case where it is not possible to determine (confirm) the frequency band in which a higher priority level is to be set. For example, in a case where the moving station moves in the arrow (3) direction, it may not be possible to determine the frequency band in which a higher priority level is to be set.

In this case, however, it is possible to set (apply) the same priority level (e.g., the first priority level) to the plural frequency bands (F1 and F2) in the priority level set corresponding to the arrow (3) direction. In this case, the mobile station may search plural frequency bands to select an appropriate cell (base station).

Base Station Apparatus

Figure 9:
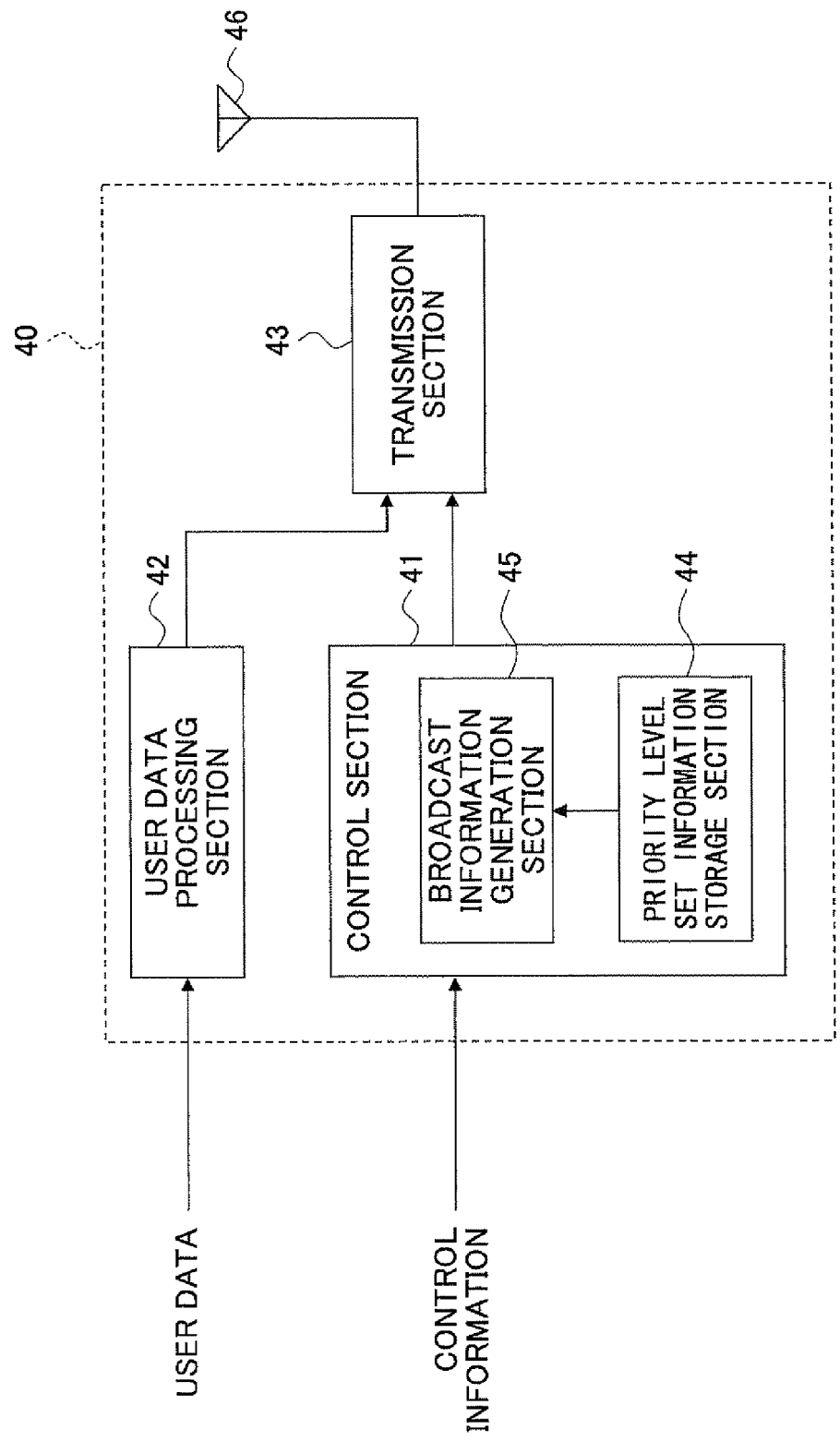
FIG. 9 is a drawing illustrating an example configuration of a base station apparatus according to the second embodiment.

FIG. 9 illustrates an example configuration of the base station apparatus forming cells. Here, a part is illustrated where a process relevant to the downlink user data and the control data is performed. In FIG. 9, a base station apparatus 40 includes a control section 41, a user data processing section 42, and a transmission section 43.

It is assumed that the base station already knows the arranged state of the base stations relevant the neighboring cells and the frequency bands used in the cells. Based on that, in a priority level set information storage section 44 of the control section 41, a priority level set table information where the priority level sets of the frequency bands are associated with the moving directions is registered in advance.

FIG. 10 illustrates an example of a priority level table according to an embodiment. The priority level table of FIG. 10 exemplarily illustrates the contents of the priority level set information storage section 44 of the base station apparatus 40 forming the cell #A of FIG. 8. Here, the degrees of the moving directions are determined by assuming that the north direction (cell#0 direction) from the base station apparatus of the cell #A is 0 degrees, and increase in the clockwise direction.

In the priority level set, the frequency band having the first priority level, the frequency band having the second priority level, the frequency band having the third priority level, the frequency band having the fourth priority level and the like (in this embodiment, up to the second priority level only) are registered. Here, a case is described where the number of the moving directions in the priority level table is six. However, the number of the moving directions in the priority level table may be more than or less than six.

A broadcast information generation section 45 in the control section 41 receives the control information from the upper apparatus (e.g., the base station control apparatus), and further receives the priority level set table information from the priority level set information storage section 44. The broadcast information generation section 45 generates a broadcast information based on the control information and the priority level set table information.

Further, the broadcast information generation section 45 generates an error correction code with respect to the broadcast information, performs data modulation based on a designated modulation method to output a downlink control signal to the transmission section 43.

The user data processing section 42 receives downlink user data from the upper apparatus (e.g., the base station control apparatus). The user data processing section 42 generates an error correction code with respect to the user data and performs data modulation based on the designated modulation method to output a downlink data signal to the transmission section 43.

The transmission section 43 multiplexes the downlink control signal from the control section 41 with the downlink data signal from the user data processing section 42 to generate a signal based on a predetermined radio access method (OFDMA). After that, the signal is converted from a base baseband signal to a radio-frequency signal by performing a D/A conversion and a quadrature modulation, so that the radio frequency signal is transmitted via an antenna 46.

In this embodiment as well, the configurations of the Intra-frequency cell reselection information for each frequency described in SIB5 may be changed to the configurations for each moving direction. By doing this, the priority level set table information may be broadcast (reported).

Mobile Station Apparatus

Figure 11:
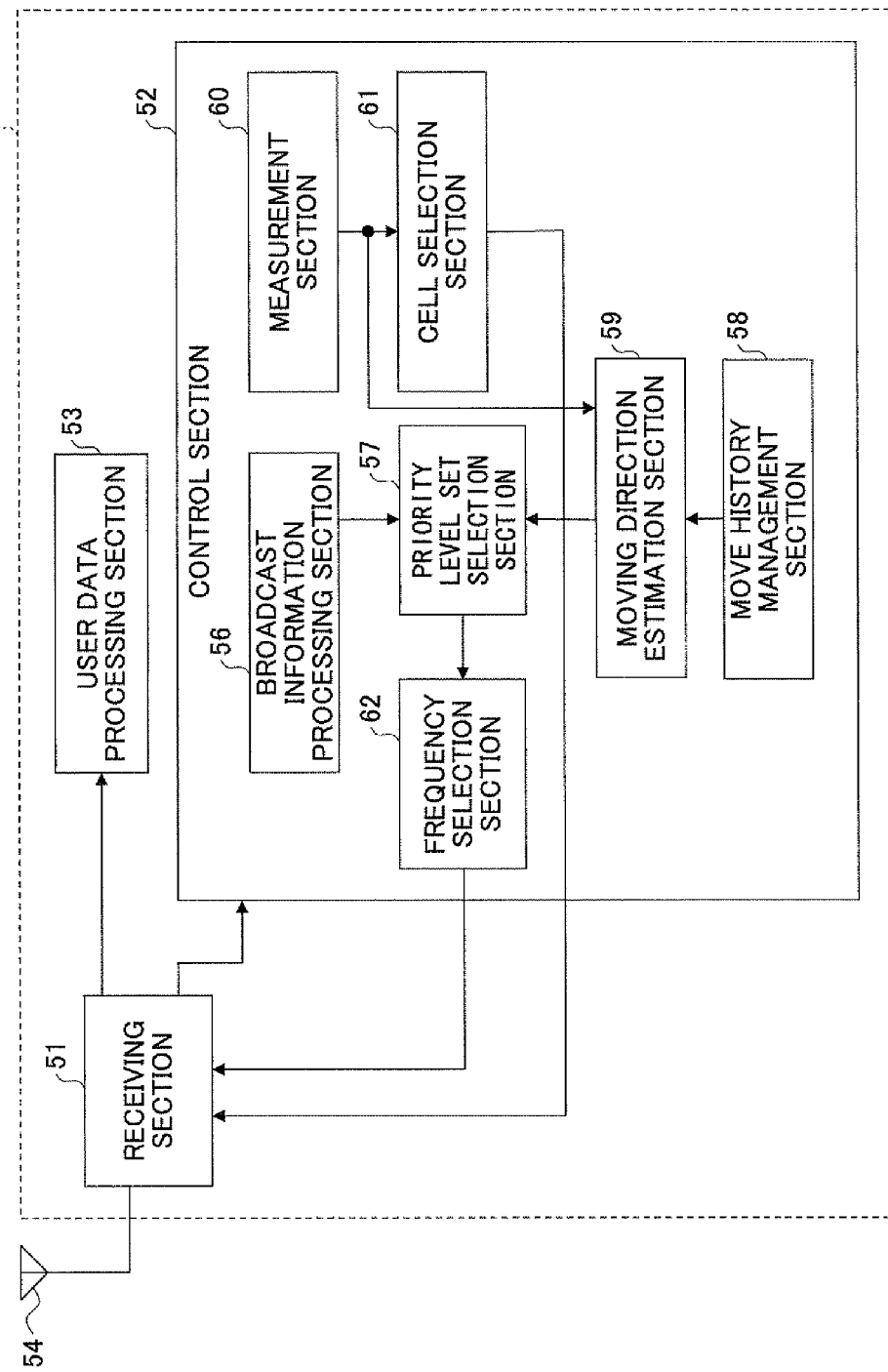
FIG. 11 is a drawing illustrating an example configuration of a moving station apparatus according to the second embodiment.

FIG. 11 illustrates an example configuration of a mobile station apparatus according to the second embodiment. Here, a part is illustrated where a process relevant to downlink user data and control data is performed. In FIG. 11, a mobile station apparatus 50 includes a receiving section 51, a control section 52, and a user data processing section 53.

The receiving section 51 converts the radio frequency signal received by an antenna 54 into a baseband signal, and performs a quadrature demodulation and the A/D conversion. Further, the receiving section 51 performs a receiving process based on the predetermined radio access method (OFDMA), the receiving process including FFT timing detection, removal of GI, a FFT process and the like, so that the received signal is separated into the data signal and the control signal. The separated control signal is output to the control section 52, and the separated data signal is output to the user data processing section 53.

A broadcast information processing section 56 in the control section 52 extracts the priority level set table information illustrated in FIG. 10 from the control signal received from the receiving section 51, and outputs the priority level set table information to a priority level set selection section 57. The priority level set selection section 57 stores the priority level set table information.

A move history management section 58 stores the information of the cells where the mobile station had been located before. Upon receiving a report from a measurement section 60, the report indicating that the received level (or the received quality) at the receiving section 51 is reduced to a level lower than a predetermined threshold value, a moving direction estimation section 59 receives the information of the cells where the mobile station had been located before from the move history management section 58, and estimates the moving direction of the mobile station based on the information.

Then, the moving direction estimation section 59 reports the estimated moving direction to the priority level set selection section 57. Alternatively, the move history management section 58 may store past GPS information, so that the moving direction estimation section 59 may estimate the moving direction based on the GPS information.

The priority level set selection section 57 selects the priority level set corresponding to the moving direction of the mobile station based on the priority level set table information of FIG. 10, and outputs the frequency bands included in the selected priority level set to a frequency selection section 62.

The frequency selection section 62 sequentially selects the priority levels included in the priority level set in the increasing order of the priority levels (i.e., in the order of the first priority level, the second priority level, and so forth), and reads and outputs the frequency band corresponding to the selected priority level to the receiving section 51. Upon receiving the frequency band corresponding to the selected priority level, the receiving section 51 searches the frequency band.

The measurement section 60 in the control section 52 measures the received level (or the received quality) at the receiving section 51, and reports the measured value to a cell selection section 61. Further, the measurement section 30 reports information indicating whether the (measured) received level (or the received quality) is greater than or less than a predetermined value or less than the predetermined value to the cell selection section 61 and the moving direction estimation section 59.

While the receiving section 51 searches, the cell selection section 61 selects the cell having the received level (or the received quality) greater than or equal to the predetermined threshold value and having the maximum receiving level (or the receiving quality) as the standby cell (reselection cell). The cell selection section 31 stores and outputs the information of the selected cell to the receiving section 51.

Flowchart

Figure 12:
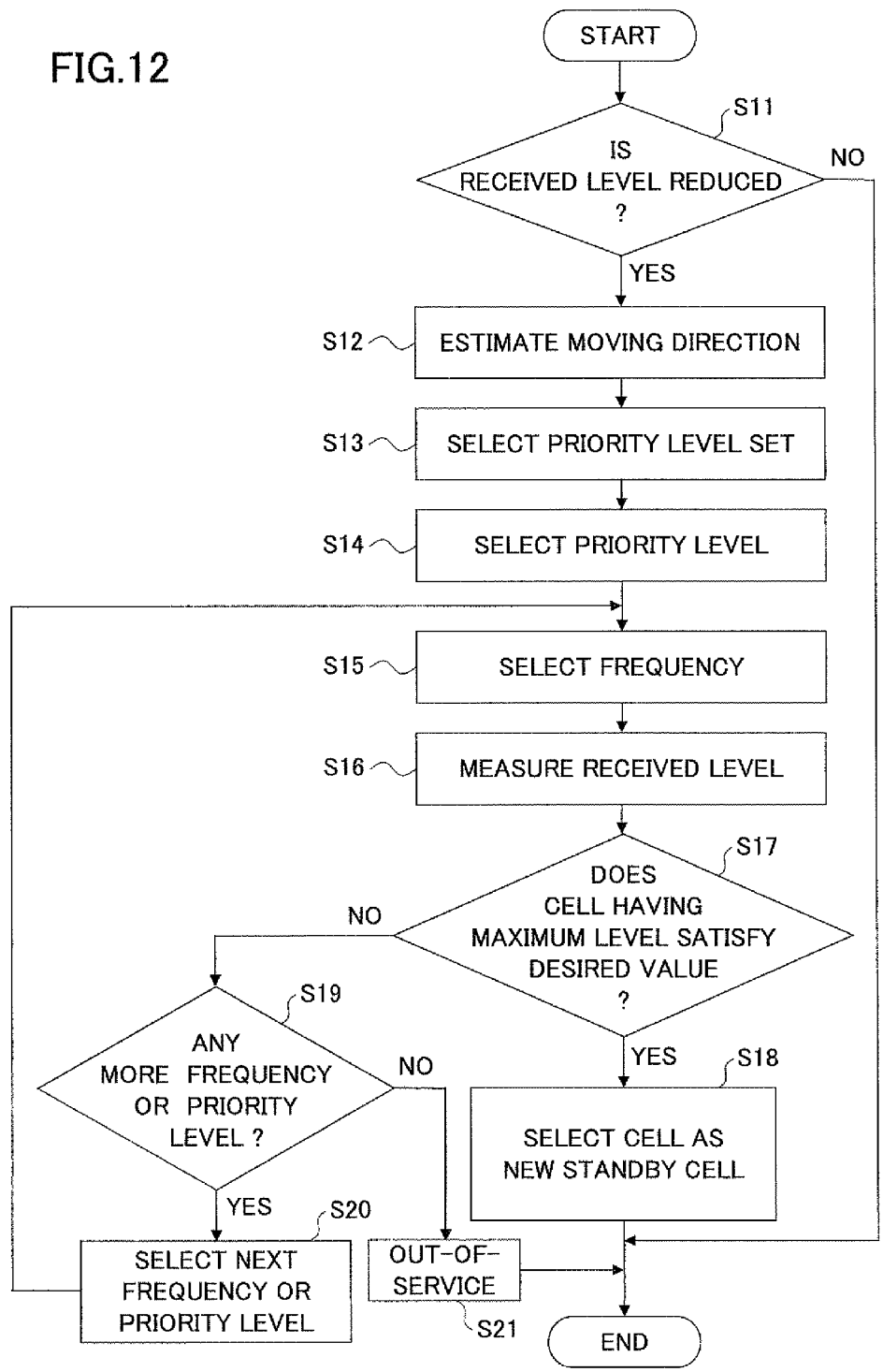
FIG. 12 is an example flowchart of the cell reselection process according to the second embodiment.

FIG. 12 is an example flowchart of the cell reselection process executed by the mobile station apparatus according to the second embodiment. In FIG. 12, in step S11, the measurement section 60 determines whether the receive level (or the received quality) is lower than a predetermined value. When determining that the receive level (or the received quality) is lower than the predetermined value (YES in step S11), the process goes to step S12. Otherwise (i.e., NO in step S11), the process ends.

In step S12, the moving direction estimation section 59 estimates the moving direction of the mobile station based on the information indicating the cells where the mobile stations had been located before, the information being received from the move history management section 58. In step S13, the priority level set selection section 57 selects the priority level set corresponding to the moving direction of the mobile station based on the priority level set table information.

In step S14, the frequency selection section 62 sequentially selects the frequency bands included in the priority level set in the increasing order of the priority levels. Then, in step S15, the frequency selection section 62 reads and outputs the frequency band corresponding to the selected priority level to the receiving section 51. The reason why two separated steps S14 and S15 are provided is that there may be a case where plural frequency bands are set in a single (the same) priority level.

In step S16, the measurement section 60 searches the selected frequency band and measures the received level (or the received quality).

Next, in step S17, the cell selection section 61 determines whether the maximum received level (or the received quality) of the cell satisfies a required value, that is, whether the received level (or the received quality) is greater than or equal to a threshold value. When determining that the condition in step S17 is satisfied (YES in step S17), the process goes to step S18. In step S18, the cell (i.e., the cell having the maximum received quality) is selected as the new standby cell. Then, the process ends.

On the other hand, when determining that the condition in step S17 is not satisfied (NO in step S17), the process goes to step S19. In step S19, it is determined whether there is the next frequency (the same priority level) or there is the next priority level remaining. When determining that there is the next frequency or the priority level (YES in step S19), the process goes to step S20, where the next frequency or the priority level is set and the process goes back to step S15.

When determining that there is no next frequency and next priority left (NO in step S19), the process goes to step S21. In step S21, it is determined that the mobile station is located in an out-of-service area, and the process ends.

By doing this, it may become possible to select an appropriate cell as the standby cell in accordance with the moving direction of the mobile station.

In this embodiment, the terms "broadcast information generation section 45", "priority level set selection section 57", and "cell selection section 61" are used as the examples of a priority level information broadcast unit, a priority level information selection unit, and a standby cell selection unit, respectively.

According to an embodiment, it may become possible to select a cell as an appropriate standby cell in an easy method. Therefore, even when communications start in a standby state, it may become possible to reduce the interferences from and to other stations. As a result, it may become possible to reduce the process delay in the cell selection process.

All examples and conditional language provided herein are intended for the pedagogical purpose of aiding the reader in understanding the invention and the concepts contributed by the inventor to further the art, and not be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alteration could be made hereto without departing from the spirit and scope of the invention.

What is claimed is:

1. A mobile communication system comprising:
    a plurality of base stations forming cells; and
    a mobile station being disposed in one of the cells and wirelessly communicating with one of the plurality of base stations,
    wherein each one of the plurality of the base stations includes
        a cell group information broadcast unit configured to broadcast cell group information where moving directions are associated with cell groups, and
    wherein the mobile station includes
        a moving direction estimation unit configured to estimate a moving direction of the mobile station when receiving quality is reduced in a standby operation;
        a cell group information selection unit configured to select a cell group corresponding to the estimated moving direction of the mobile station from the cell groups in the cell group information broadcast by the one of the plurality of base stations, and
        a standby cell selection unit configured to select, as a new standby cell, a cell having a receiving state satisfying a desired condition from cells included in the selected cell group.

2. The mobile communication system as claimed in claim 1,
    wherein the cell group information comprises cell numbers and frequency bands of each of the cell groups on a moving direction basis.

3. A mobile communication system comprising:
    a plurality of base stations forming cells; and
    a mobile station being disposed in one of the cells and wirelessly communicating with one of the base stations,
    wherein each of the plurality of base stations includes
        a priority level information broadcast unit configured to broadcast priority level information where moving directions are associated with priority level sets each including frequency bands associated with priority levels,
    and wherein the mobile station includes
        a moving direction estimation unit configured to estimate a moving direction of the mobile station when receiving quality is reduced in a standby operation;
        a priority level information selection unit configured to select a priority level set corresponding to the estimated moving direction of the mobile station from the priority level sets in the priority level information broadcast by the one of the plurality of base stations, and
        a standby cell selection unit configured to perform a cell search using the frequency bands in the selected priority level set in order of the priority levels and select, as a new standby cell, a cell having a receiving state satisfying a desired condition based on a result of the cell search.

4. A cell selection method for a mobile communication system including a plurality of base stations and a mobile station, the plurality of base stations forming cells, the mobile station being disposed in one of the cells and wirelessly communicating with one of the plurality of base stations, the cell selection method comprising:
    broadcasting, by one of the plurality of base stations, cell group information where moving directions are associated with cell groups;
    estimating, by the mobile station, a moving direction of the mobile station when receiving quality is reduced in a standby operation;
    selecting, by the mobile station, a cell group corresponding to the estimated moving direction of the mobile station from the cell groups in the cell group information broadcast by the one of the plurality of base stations; and
    selecting, by the mobile station, as a new standby cell, a cell having a receiving state satisfying a desired condition from cells included in the selected cell group.

5. The mobile communication system according to claim 4, wherein the cell group information comprises cell numbers and frequency bands of each of the cell groups on a moving direction basis.

6. A cell selection method for a mobile communication system including a plurality of base stations and a mobile station, the plurality of base stations forming cells, the mobile station being disposed in one of the cells and wirelessly communicating with one of the plurality of base stations, the cell selection method comprising:
    broadcasting, by one of the plurality of base stations, priority level information where moving directions are associated with priority level sets each including frequency bands associated with priority levels;
    estimating, by the mobile station, a moving direction of the mobile station when receiving quality is reduced in a standby operation;
    selecting, by the mobile station, a priority level set corresponding to the estimated moving direction of the mobile station from the priority level sets in the priority level information broadcast by the one of the plurality of base stations;
    cell searching, by the mobile station, frequency bands in the selected priority level set in order of the priority levels, and
    selecting, by the mobile station, as a new standby cell, a cell having a receiving state satisfying a desired condition based on a result of the cell search.

7. A base station apparatus in a mobile communication system including a plurality of base stations and a mobile station, the plurality of base stations forming cells, the mobile station being disposed in one of the cells and wirelessly communicating with one of the plurality of base stations, the base station apparatus comprising:
- a cell group information broadcast unit configured to broadcast cell group information where moving directions are associated with cell groups.

8. The base station apparatus according to claim 7, wherein the cell group information comprises cell numbers and frequency bands of each of the cell groups on a moving direction basis.

9. A mobile station apparatus in a mobile communication system including a plurality of base stations and a mobile station, the plurality of base stations forming cells, the mobile station being disposed in one of the cells and wirelessly communicating with one of the plurality of base stations, the mobile station apparatus comprising:
- a moving direction estimation unit configured to estimate a moving direction of the mobile station when receiving quality is reduced in a standby operation;
- a cell group information selection unit configured to select a cell group corresponding to the estimated moving direction of the mobile station from the cell groups in the cell group information broadcast by one of the plurality of base stations,
- and a standby cell selection unit configured to select, as a new standby cell, a cell having a receiving state satisfying a desired condition from cells included in the selected cell group.

10. The mobile station apparatus according to claim 9, wherein the cell group information comprises cell numbers and frequency bands of each of the cell groups on a moving direction basis.

11. A base station apparatus in a mobile communication system including a plurality of base stations and a mobile station, the plurality of base stations forming cells, the mobile station being disposed in one of the cells and wirelessly communicating with one of the plurality of base stations in the cells, the base station apparatus comprising:
- a priority level information broadcast unit configured to broadcast priority level information where moving directions are associated with priority level sets each including frequency bands associated with priority levels.

12. A mobile station apparatus in a mobile communication system including a plurality of base stations and a mobile station, the plurality of base stations forming cells, the mobile station being disposed in one of the cells and wirelessly communicating with one of the plurality of base stations in the cells, the mobile station apparatus comprising:
- a moving direction estimation unit configured to estimate a moving direction of the mobile station when receiving quality is reduced in a standby operation;
- a priority level information selection unit configured to select a priority level set corresponding to the estimated moving direction of the mobile station from the priority level sets in the priority level information broadcast by the one of the plurality of base stations, and
- a standby cell selection unit configured to perform a cell search using the frequency bands in the selected priority level set in order of the priority levels and select, as a new standby cell, a cell having a receiving state satisfying a desired condition based on a result of the cell search.

* * * * *